United States Patent [19]

Nelson

[11] Patent Number: 5,083,120

[45] Date of Patent: Jan. 21, 1992

[54] FLAT PANEL DISPLAY UTILIZING LEAKY LIGHTGUIDES

[75] Inventor: Terence J. Nelson, New Providence, N.J.

[73] Assignee: Bell Communications Research, Inc., Livingston, N.J.

[21] Appl. No.: 484,388

[22] Filed: Feb. 23, 1990

[51] Int. Cl.$^5$ .............................................. G09G 3/36
[52] U.S. Cl. .................................... 340/784; 358/236
[58] Field of Search ...................... 340/784, 783, 782; 350/345, 350 S, 339 D, 338, 333, 330; 358/236, 240, 241

[56] References Cited

U.S. PATENT DOCUMENTS

| | | | |
|---|---|---|---|
| 4,233,493 | 11/1980 | Nath | 350/96.1 |
| 4,737,896 | 4/1988 | Mochizuki et al. | 350/345 |
| 4,804,253 | 2/1989 | Stewart | 350/330 |
| 4,874,227 | 10/1989 | Matsuka et al. | 350/339 D |
| 4,978,952 | 12/1990 | Irwin | 358/236 |

OTHER PUBLICATIONS

"Row-Backlight, Column-Shutter Display Concept", T. J. Nelson et al., Appl. Phys. Lett. 52(13), pp. 1034-1036, Mar. 28, 1988.
"Row-Backlight, Column-Shutter Display: A New Display Format", T. J. Nelson et al., Displays, vol. 10, pp. 76-80, Apr. 1989.
"Ferroelectric Liquid Crystal Has Much Faster Response", Koji Iwasa, Journal of Electrical Engineering, pp. 33-37, Sep. 1986.
"Properties and Applications of Ferroelectric Liquid Crystals", J. S. Patel et al., Optical Engineering, vol. 26, No. 5, pp. 373-384, May 1987.
"Ferroelectric Liquid Crystal Display Capable of Video Line Address Times", M. F. Bone et al., Displays, pp. 115-118, Jul. 1987.
"High-Resolution and High-Speed Printing Head Using ⅓-Duty Multiplexed Ferroelectric Liquid-Crystal Shutter Array", S. Naemura et al., SID 87 Digest, pp. 356-359.

Primary Examiner—Alvin E. Oberley
Assistant Examiner—Xiao M. Wu
Attorney, Agent, or Firm—James W. Falk; Leonard Charles Suchyta

[57] ABSTRACT

In a row-backlight column-shutter display, an array of sequentially illuminated leaky lightguides is utilized as the row-backlight component of the display. Light is coupled into each guide from a small high-peak-brightness source such as a light-emitting diode. Each guide is designed to leak light in a substantially uniform manner along the entire extent of a longitudinally extending edge of the guide. By combining such a row back light with an orthogonally disposed column shutter such as an array of ferroelectric liquid crystals, an advantageous flat panel display is realized.

17 Claims, 3 Drawing Sheets

FLAT PANEL DISPLAY UTILIZING LEAKY LIGHTGUIDES

BACKGROUND OF THE INVENTION

This invention relates to a flat panel display and, more particularly, to a display of the row-backlight column-shutter type.

An article by T. J. Nelson, J. S. Patel and P. D. T. Ngo in *Applied Physics Letters*, vol. 52, No. 13, Mar. 28, 1988, pages 1034–1036, describes the basic concept and configuration of a flat panel display of the row-backlight column-shutter type. Further details of such a display are set forth by Nelson and Patel in an article in *Display*, Vol. 10, April 1989, pages 76–80. In both articles, an array of ferroelectric liquid crystals is described as forming an advantageous column-shutter component for the display.

In the aforementioned second-cited article and in a copending commonly assigned application, Ser. No. 180,442, filed Apr. 12, 1988, now U.S. Pat. No. 4,924,215 various instrumentalities are described for making the row-backlight component of such a flat panel display. These instrumentalities include conventional arrays of electroluminescent, plasma or vacuum-fluorescent elements arranged in rows that are sequentially activated to emit light.

Efforts have continued by workers skilled in the art aimed at trying to devise yet additional ways in which to make an array of emitters suitable for forming the row-backlight component of a flat panel display. These efforts have been motivated by a desire to improve the row-backlight component in such ways as by increasing its peak brightness and efficiency, by decreasing the persistence of a row after it is deactivated, by facilitating row-by-row addressability of the array and by making the component relatively easy to manufacture. It was recognized that these efforts, if successful, could provide a flat panel display whose attractiveness for important commercial applications would be significantly enhanced.

SUMMARY OF THE INVENTION

In accordance with the principles of the present invention, an array comprising multiple rows of elongated leaky lightguides is utilized as the row-backlight component of a flat panel display. Small high-peak-brightness emitters such as light-emitting diodes are employed to inject light into the guides in a row-by-row fashion. Each illuminated guide is designed to leak light in a substantially uniform manner along the entire extent of a longitudinally extending edge of the guide.

BRIEF DESCRIPTION OF THE DRAWING

A complete understanding of the present invention and of the above and other features thereof will be apparent from a consideration of the detailed description below taken in conjunction with the accompanying drawing, not drawn to scale, in which.

DETAILED DESCRIPTION

Figure 1:
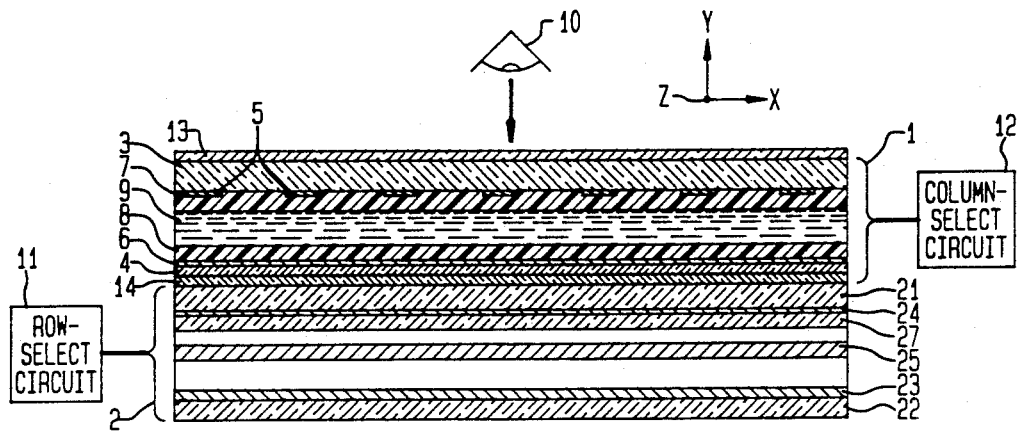
FIG. 1 is a simplified schematic top-view representation of a conventional flat panel display of the row-backlight column-shutter type.

The conventional display represented in FIG. 1 includes upper and lower components 1 and 2, respectively. By way of example, the component 1 comprises a standard ferroelectric liquid crystal (FLC) column shutter, and the component 2 comprises a standard vacuum-fluorescent row backlight. Each of these components is conventional in design and can be made by straightforward techniques.

Symbol 10 in FIG. 1 represents a viewer. The columns of the shutter component 1 are each parallel to the Z axis and the column array lies in the X-Z plane. The rows of the backlight component 2 are each parallel to the X axis and the row array also lies in the X-Z plane. The rows of the display are addressed in sequence by row-select circuit 11 to activate one row at a time to emit light. While each row is activated, the columns are independently addressed simultaneously by column-select circuit 12 to cause the liquid crystal material at each overlapping intersection defined by an activated row and an addressed column to transmit or not transmit light to the viewer, depending on the nature of the electrical signals applied to the material. In that way, the constituent picture elements (pixels) of an image are formed.

The standard column shutter 1 shown in FIG. 1 includes a pair of spaced-apart glass plates 3 and 4. Elongated transparent column conductors 5 are formed on the plate 3. The other plate 4 has a continuous conductive coating thereon which constitutes a counter electrode 6 for the shutter component. The circuit 12 is electrically connected to the electrodes 5 and 6. Additionally, the shutter 1 includes conventional polarizer-/analyzer elements 13 and 14 whose function in transmitting or blocking light in such a shutter is well known.

Further, the shutter 1 of FIG. 1 includes a liquid crystal layer 9 disposed between conventional alignment layers 7 and 8. Advantageously, the layer 9 comprises a smectic C* (ferroelectric) phase liquid crystal material. Such materials and their use in high-speed shutters are described in the following articles: K. Iwasa, *Journal of Electrical Engineering*, September 1986, pages 33–37; J. S. Patel et al, *Optical Engineering* 26, (5), 1987, pages 373–384; M. F. Bone et al, *Display*, July 1987, pages 115–118; and S. Naemura et al, *SID 87 Digest*, 1987, pages 356–359. It is well known that such a column shutter can be pulse-width modulated to achieve a gray-scale capability for displayed picture elements. By way of a particular illustrative example, the liquid crystal layer 9 of FIG. 1 is assumed to be made of an FLC material designated ZLI3654 which is commercially available from E. Merck & Company.

The standard row backlight 2 shown in FIG. 1 includes spaced-apart support plates 21 and 22. At least the plate 21 is transparent to light. A cathode 23 is contained between the plates 21 and 22. Spaced between the cathode 23 and an anode 24 which is coated with a layer 27 of a suitable phosphor is an array 25 of grids. Illustratively, the grids are each parallel to the indicated X axis and are spaced apart from each other in the X-Z plane. By applying an appropriate voltage in sequence to one pair at a time of adjacent grids, successive specified elongated portions of the phosphor layer 27 of the backlight 2 are selected and activated to emit light toward the shutter 1 in a row-by-row fashion.

In accordance with the principles of the present invention, the row backlight 2 shown in FIG. 1 is replaced with a component that comprises an array of leaky lightguides, as described in detail below. Although such a replacement component can be employed with any suitable column-shutter component, it will be assumed for illustrative purposes herein that the leaky lightguide array is combined with an FLC column shutter of the particular type described above to form a flat panel display.

Figure 2:
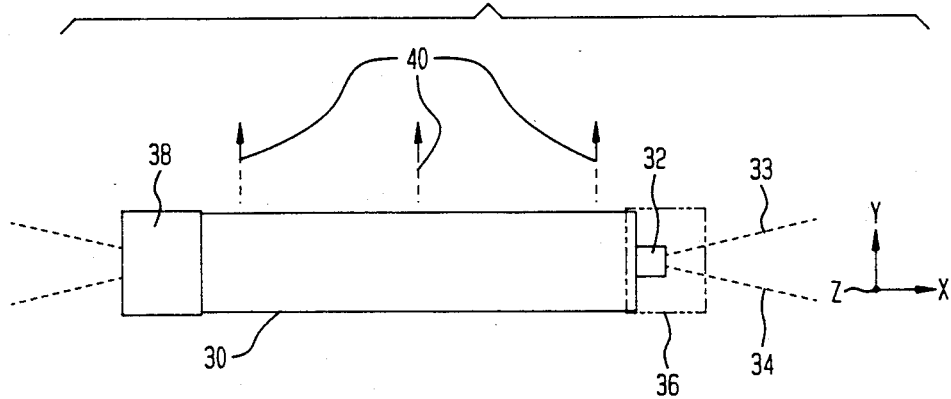
FIGS. 2 and 3 are each side views of a single leaky lightguide of the type included in an array of lightguides in a row-backlight component made in accordance with the principles of the present invention.

By way of a particular illustrative example, FIG. 2 depicts a single leaky lightguide made in accordance with the principles of the present invention. The lightguide comprises an elongated rectangular-cross-section slab 30 made, for example, of synthetic fused quartz, which has almost negligible absorption at visible wavelengths. Alternatively, the slab 30 can be made of other available low-optical-loss materials such as an acrylic acid plastic.

Illustratively, the particular slab 30 shown in FIG. 2 is about 7.6 centimeters (cm) long in the X direction, approximately 1.5 cm high in the Y direction and about 0.16 cm thick in the Z direction. As represented in FIG. 2, light is injected into each end of the slab.

Light-emitting element 32 is shown mounted on the right-hand end of the slab 30 of FIG. 2. Electrical leads 33 and 34 connected to the element 32 extend to an activation circuit such as the row-select circuit 11 shown in FIG. 1. An opaque hood or sleeve 36 (shown in dashed outline) surrounds the element 32 to prevent light emitted by the element 32 from being injected into adjacent slabs and to block stray light from reaching the viewer.

The left-hand end of the slab 30 (FIG. 2) also has a light-emitting element mounted thereon. Only the leads extending to the left-hand element are shown in FIG. 2. An opaque hood 38 surrounds the left-hand light-emitting element.

Advantageously, each of the light-emitting elements included in FIG. 2 comprises a standard light-emitting diode (LED). Illustratively, each LED is a conventional double-heterostructure GaAlAs device that emits light at a wavelength of 660 nanometers. Such diodes are characterized by high peak brightness, high efficiency and short persistence. Moreover, an array of such diodes can easily be connected in a standard matrix arrangement to facilitate addressing an array of leaky lightguides in a high-speed row-by-row fashion.

In FIG. 2, light that is injected into the slab 30 is designed to be emitted substantially uniformly from the entire surface of the narrow elongated upper face that lies in the depicted X-Z plane. Arrows 40 indicate the of the light that leaks from this face. Particular ways in which such leakage is achieved will be specified later below.

Figure 3:
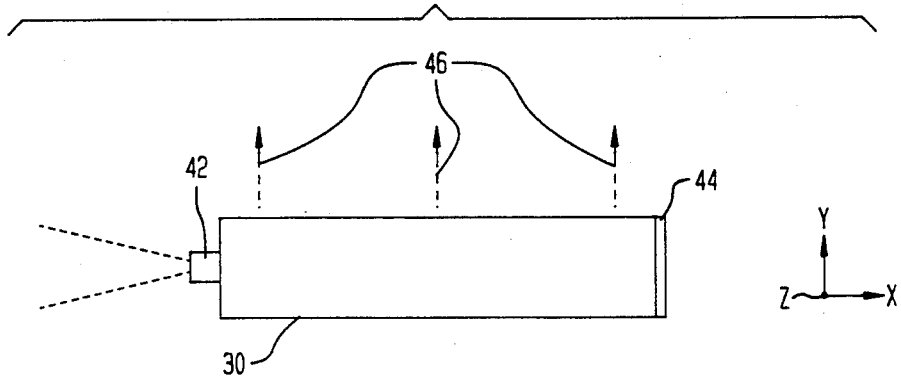

In accordance with the invention, it is feasible to utilize only one light-emitting element per leaky lightguide. Thus, as depicted in FIG. 3, the slab 30 includes only one such element 42. In this embodiment, the other or right-hand end of the slab 30 includes a mirror 44. Light injected into the slab 30 from the element 42 is designed to leak from the entire extent of the upper surface that lies in the X-Z plane, as indicated by arrows 46. As in the FIG. 2 arrangement, each end of the FIG. 3 embodiment advantageously includes an opaque hood (not shown).

If all the surfaces of the slab 30 shown in FIGS. 2 and 3 were polished, light injected into the slab 30 within a certain range of angles would undergo total internal reflection at the surfaces of the slab, as is well known in the art. Such light remains trapped within the slab 30 until scattered by some imperfection.

Figure 4:
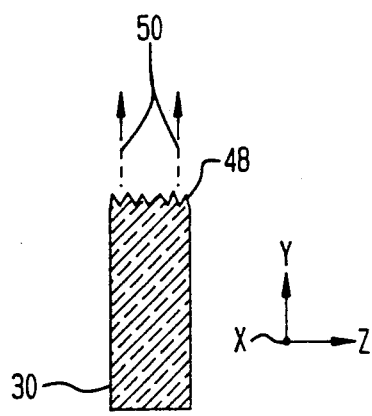
FIGS. 4, 5 and 6 are each cross-sectional end views of a leaky lightguide of the type depicted in FIG. 2 or FIG. 3.

In accordance with the invention, various ways are available for achieving light leakage from the upper surface of the slab 30 shown in each of FIGS. 2 and 3. One such basic way is illustrated in FIG. 4 wherein the bottom and side faces of the slab 30 each constitute polished surfaces. On the other hand, the top surface, from which light is purposely designed to leak, is treated to promote the escape of light therefrom. Illustratively, this is done by frosting the entirety of the top surface lying in the indicated X-Z plane with, for example, grit having a particle size of about 5 micrometers. In FIG. 4, this frosted surface is designed by reference numeral 48. Arrows 50 indicate the direction of light that leaks from the surface 48.

Figure 5:
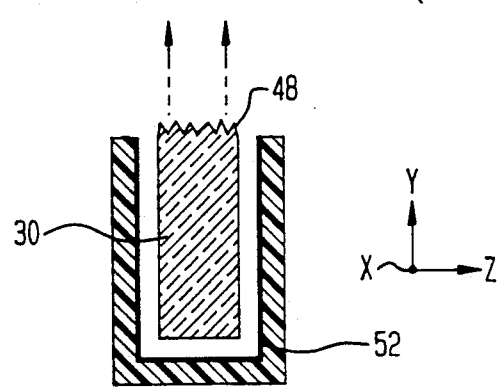

A more effective way of achieving controlled leakage from a lightguide in accordance with the principles of the present invention is shown in FIG. 5. In that embodiment, the bottom and side faces of the slab 30 are surrounded by, but not in optical contact with, a reflecting film 52. In that way, light that otherwise would escape is redirected toward the frosted surface 48. A relatively high-brightness row emitter is thereby provided.

Figure 6:
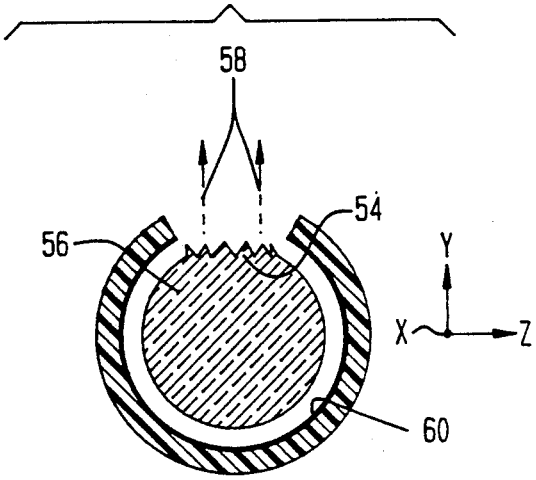

Leaky lightguides made in accordance with this invention can have cross-sections other than the particular rectangular cross-section specified above. Thus, for example, a conventional optical fiber can be modified to serve as a leaky lightguide. This is illustrated in FIG. 6 wherein a narrow longitudinal surface portion 54 of optical fiber 56 is frosted to promote light leakage therefrom. Upwardly directed light leaked from the fiber 50 is represented by arrows 58. The remainder of the surface of the fiber 56 is advantageously surrounded by, but not in optical contact with, a reflecting film 60, thereby to minimize lost light and enhance the brightness of the upwardly directed leaked light.

Figure 7:
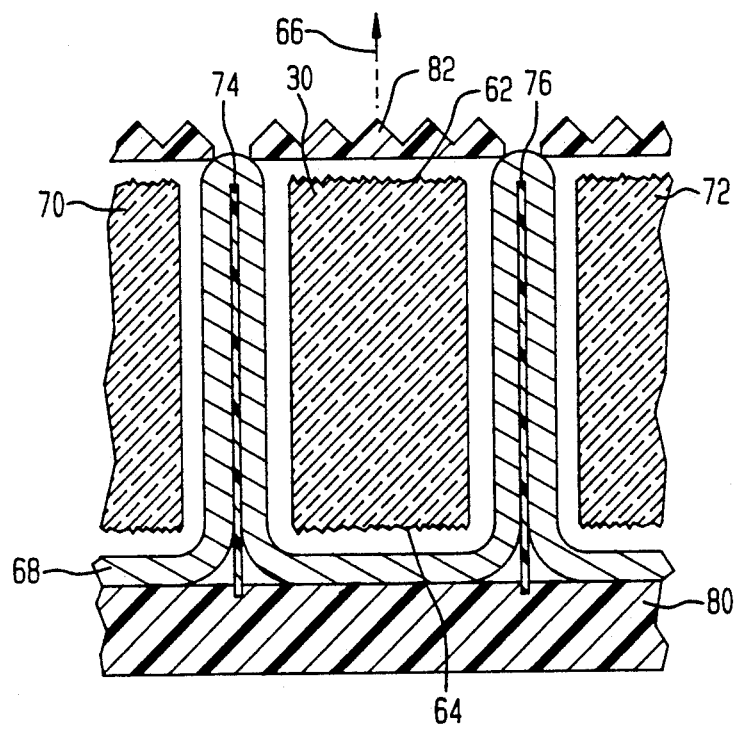
FIG. 7 is a cross-sectional end view of a particularly advantageous array of leaky lightguides made in accordance with the invention.

A particularly advantageous leaky lightguide made in accordance with the principles of the present invention is shown in FIG. 7. In practice, the depicted lightguide leaks light from the top thereof in a substantially uniform manner along its entire longitudinal extent in the X direction.

To facilitate light leakage therefrom in a controlled manner, the light-conducting slab 30 shown in FIG. 7 includes frosted top and bottom surfaces 62 and 64, respectively. Output light from the overall leaky lightguide structure is emitted in the direction of arrow 66. Light that escapes from the slab 30 via the bottom frosted surface 64 is mostly redirected to the top of the structure to contribute to the useful output light emitted along the entire X-direction extent thereof. This redirected light thus augments the light directly emitted from the top surface 62. In practice, it has been found that the net result of this augmentation is to provide a substantially uniform high-brightness ribbon-shaped output beam.

In the FIG. 7 structure, the elongated slab 30 is contained within a coextensive chamber that is defined on three sides by a diffuse reflecting film 68. The film 68 serves to redirect most of the light emitted from the frosted bottom surface 64, as well as light that escapes through the sides of the slab 30, toward the top of the structure. Light reflected from the film 68 propagates to the top of the structure either via the slab 30 or by transmission in the hollow space between the slab 30 and the film 68.

Mechanical support of the slab 30 within the chamber shown in FIG. 7 can be accomplished in any straightforward way. Thus, for example, the slab 30 can be mechanically supported at the respective ends thereof. Or spacer/support elements (not shown) can be positioned along the sides and/or bottom of the slab to retain it in the indicated position. In any case, the slab 30 is thereby spaced apart optically from and approximately centered within the chamber walls formed by the reflecting film 68.

In a practical row-backlight component for a flat-panel display, multiple leaky lightguides each of the type shown in FIG. 7 and described above are arranged side-by-side to form an array. In FIG. 7, portions of the adjacent light-conducting leaky slabs 70 and 72 included in such an array are depicted. In one practical embodiment, lightguides were placed side-by-side on 0.25-cm centers.

To prevent any light emanating from an activated leaky lightguide from coupling into adjacent lightguides, each elongated lightguide is advantageously optically isolated from adjacent lightguides. As illustrated in FIG. 7, this can be done, for example, by mounting an elongated opaque member between adjacent lightguides. Thus, opaque member 74 provides optical isolation between the light-conducting slabs 30 and 70, whereas opaque member 76 provides optical isolation between the light-conducting slabs 30 and 72. The members 74 and 76, a well as the reflecting film 68, are supported by a substrate 80.

Advantageously, the FIG. 7 structure also includes an elongated lenticular screen element overlying and spaced apart from the top frosted surface of each light-conducting slab. Thus, for example, lenticular screen element 82 is shown in FIG. 7 associated with the slab 30. The element 82 ensures that the angular distribution of light emanating from the top of the leaky lightguide 30 will fall within a desirable viewing range. One such illustrative element 82 comprises a 0.05-cm thick polycarbonate member having about twenty-eight 90-degree prisms per cm molded on the upper side thereof.

Leaky lightguides of the type described herein and illustrated, for example, in FIGS. 5 and 6 are well suited to be made in a self-supporting way as independent elements without the use of a common substrate. Moreover, column-shutter components such as an FLC shutter can also be made in a self-supporting fashion as an independent element by, for example, molding a plastic member to form an elongated cavity for containing a liquid crystal material. Large numbers of such independent self-supporting elements formed as ribbons or tapes can then be arranged orthogonally with respect to each other, with threads utilized to retain the elements together, thereby to form a large-area display. Such a so-called woven display made up of relatively simple individual elements avoids the fabrication complexities involved in processing large substrates.

Finally, it is to be understood that the above-described specific arrangements are only illustrative of the application of the principles of the present invention. In accordance with these principles, numerous modifications and alternatives may be devices by those skilled in the art without departing from the spirit and scope of the invention. Thus, for example, although particular emphasis herein has been directed to the use of LEDs as the light sources for the leaky lightguide array, it is apparent that other small high-peak-brightness sources such as lasers exhibit the requisite characteristics for use in such an array. Additionally, in some cases it may be desirable not to dedicate one (or two) light sources per lightguide but instead to use only one (or two) sources for multiple lightguides and to optically switch the output of each source in sequence from guide to guide. Also, the use of an FLC column shutter with the unique leaky lightguide row backlight described herein is illustrative only. Other known column shutters, such as those based on the use of PLZT ceramic materials, can also be combined with a leaky lightguide array made in accordance with the invention to form a flat panel display.

What is claimed is:

1. A flat panel display assembly comprising a column-shutter subassembly including a plurality of addressable columns each capable of altering the transmission of light therethrough in response to activation thereof, and a row-backlight subassembly disposed behind and in close proximity to said column-shutter subassembly, said row-backlight subassembly including a plurality of addressable rows each capable of emitting light in response to activation thereof, said columns and rows being orthogonally disposed with respect to each other and defining at overlapping intersections thereof picture elements of an image to be displayed, the rows of said row-backlight subassembly respectively comprising elongated leaky lightguides.

2. An assembly as in claim 1 further including means for injecting light into said lightguides.

3. An assembly as in claim 2 wherein each of said lightguides includes means on a limited surface portion thereof along the entire longitudinal extent of the guide for causing light to leak therefrom toward said column-shutter subassembly.

4. An assembly as in claim 3 wherein each of said lightguides is made of fused quartz.

5. An assembly as in claim 3 wherein said means for injecting comprises a light-emitting diode.

6. An assembly as in claim 5 wherein each lightguide has light-emitting diodes coupled to the respective ends thereof.

7. An assembly as in claim 5 wherein each lightguide has a light-emitting diode coupled to one end thereof and a reflecting surface on the other end thereof.

8. An assembly as in claim 5 wherein said means for causing light to leak from each guide comprises a frosted portion.

9. An assembly as in claim 8 wherein the remaining surface of each guide is polished.

10. An assembly as in claim 9 further including a member for reflecting light that propagates through said polished surface.

11. An assembly as in claim 10 wherein said reflecting member comprises a reflecting surface spaced apart from said polished surface.

12. An assembly as in claim 11 wherein each of said lightguides includes an additional frosted portion on the surface thereof in opposed relationship to said firstmentioned frosted portion and coextensive therewith.

13. An assembly as in claim 12 further including a lenticular screen in close proximity to the first-mentioned frosted portion of each lightguide and coextensive therewith for controlling the angular distribution of light emanating from each lightguide.

14. An assembly as in claim 13 further including a row-select circuit connected to said light-emitting diodes for causing light to be injected into said plural lightguides in a row-by-row fashion.

15. An assembly as in claim 14 further including a column-select circuit connected to the columns of said column-select subassembly for independently electrically controlling said columns while each lightguide is emitting.

16. An assembly as in claim 15 wherein the columns of said column-shutter assembly comprise ferroelectric liquid crystal elements.

17. An assembly as in claim 1 wherein each of said lightguides has a substantially uniform cross-section.

* * * * *